(12) United States Patent
Jaffrennou et al.

(10) Patent No.: US 9,174,868 B2
(45) Date of Patent: *Nov. 3, 2015

(54) SIZING COMPOSITION FOR MINERAL WOOL BASED ON MALTITOL AND INSULATING PRODUCTS OBTAINED

(75) Inventors: Boris Jaffrennou, Paris (FR); Edouard Obert, Coye-la-Foret (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 709 days.

This patent is subject to a terminal disclaimer.

(21) Appl. No.: 13/333,475

(22) Filed: Dec. 21, 2011

(65) Prior Publication Data

US 2013/0026408 A1 Jan. 31, 2013

(30) Foreign Application Priority Data

Jul. 27, 2011 (FR) ...................... 11 02369

(51) Int. Cl.
C03C 25/26 (2006.01)
C09J 105/00 (2006.01)
C03C 25/32 (2006.01)

(52) U.S. Cl.
CPC .............. *C03C 25/26* (2013.01); *C03C 25/321* (2013.01)

(58) Field of Classification Search
CPC ...... C03C 25/26; C03C 25/321; C08B 37/00; C08K 5/0025; C08L 3/00; C08L 3/02; C08L 5/00; C09J 105/00
USPC ................. 106/146.1, 146.4, 146.5; 252/62
See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 8,623,234 B2 * | 1/2014 | Jaffrennou et al. ............ 252/62 |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0148966 A1 * | 7/2005 | Stoyanov et al. ............ 604/367 |
| 2005/0215153 A1 | 9/2005 | Cossement et al. |
| 2006/0188465 A1 * | 8/2006 | Perrier et al. ............ 424/70.13 |
| 2011/0210280 A1 * | 9/2011 | Jaffrennou ..................... 252/62 |
| 2012/0319029 A1 * | 12/2012 | Jaffrennou et al. ............ 252/62 |
| 2013/0032749 A1 * | 2/2013 | Jaffrennou et al. ............ 252/62 |

FOREIGN PATENT DOCUMENTS

| | | |
|---|---|---|
| WO | WO 01/96254 | 12/2001 |
| WO | WO 2006/120523 | 11/2006 |
| WO | WO 2008/053332 | 5/2008 |
| WO | WO 2010/029266 | 3/2010 |

* cited by examiner

*Primary Examiner* — Anthony J Green
(74) *Attorney, Agent, or Firm* — Pillsbury Winthrop Shaw Pittman LLP

(57) ABSTRACT

A sizing composition for insulating products based on mineral wool, in particular of rock or of glass, includes: a hydrogenated sugar or a mixture of hydrogenated sugars comprising at least 25% by weight of maltitol, calculated on the basis of the dry matter of hydrogenated sugar(s), and at least one polyfunctional crosslinking agent. Another subject matter of the present invention is the insulating products based on mineral fibers thus obtained.

40 Claims, 1 Drawing Sheet

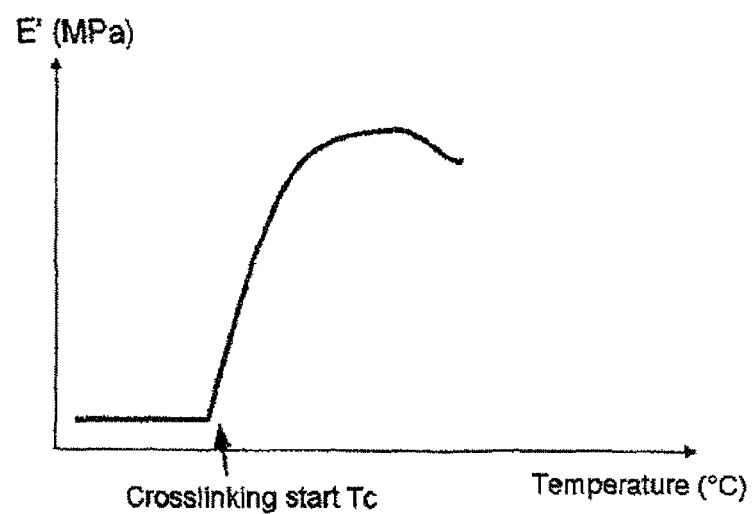

SIZING COMPOSITION FOR MINERAL WOOL BASED ON MALTITOL AND INSULATING PRODUCTS OBTAINED

CROSS REFERENCE TO RELATED APPLICATIONS

This application claims priority to French Application No. 11/02369, filed Jul. 27, 2011, the content of which is incorporated herein in its entirety by reference.

FIELD

The present invention relates to the field of thermal and/or acoustic insulating products based on mineral wool, in particular of glass or of rock, and on a formaldehyde-free organic binder.

BACKGROUND

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten mineral material (glass or rock) into a centrifugal device comprising a multitude of small orifices, the material being projected towards the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibers (or mineral wool).

External centrifugation consists, for its part, in pouring out the molten material at the external peripheral surface of rotating members, known as rotors, from where the melt is ejected under the action of the centrifugal force. Means for drawing by gas stream and for collecting on a receiving member are also provided.

In order to provide for the assembly of the fibers together and to make it possible for the web to have cohesion, a sizing composition comprising a thermosetting resin is projected onto the fibers, on the route between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea (in its turn at least partially decomposed to give ammonia) which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known and are based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Provision has been made for sizing compositions comprising a polycarboxylic polymer, a polyol and a catalyst, which catalyst is a phosphorus-comprising catalyst (U.S. Pat. No. 5,318,990, U.S. Pat. No. 5,661,213, U.S. Pat. No. 6,331,350, US 2003/0008978), a fluoroborate (U.S. Pat. No. 5,977,232) or else a cyanamide, a dicyanamide or a cyanoguanidine (U.S. Pat. No. 5,932,689).

A description has also been given of sizing compositions comprising an alkanolamine including at least two hydroxyl groups and a polycarboxylic polymer (U.S. Pat. No. 6,071,994, U.S. Pat. No. 6,099,773, U.S. Pat. No. 6,146,746) in combination with a copolymer (U.S. Pat. No. 6,299,936).

In US 2002/0091185, the polycarboxylic polymer and the polyol are used in amounts such that the ratio of the number of equivalents of OH groups to the number of equivalents of COOH groups varies from 0.6/1 to 0.8/1.

In US 2002/0188055, the sizing composition comprises a polycarboxylic polymer, a polyol and a cationic, amphoteric or nonionic surfactant.

In US 2004/0002567, the sizing composition includes a polycarboxylic polymer, a polyol and a coupling agent of silane type.

In US 2005/0215153, a description is given of a size formed from a prebinder comprising a carboxylic acid polymer and a polyol, and from a dextrin as cobinder.

A description is given, in WO 2006/120523, of a sizing composition which comprises (a) a poly(vinyl alcohol), (b) a polyfunctional crosslinking agent chosen from nonpolymeric polyacids or their salts, the anhydrides and (c) optionally a catalyst, the (a):(b) ratio by weight varying from 95:5 to 35:65 and the pH being at least equal to 1.25.

WO 2008/053332 discloses a sizing composition which comprises an adduct (a) of a sugar polymer and (b) of a polyfunctional crosslinking agent chosen from monomeric polyacids or their salts, and the anhydrides, which is obtained under conditions such that the (a):(b) ratio by weight varies from 95:5 to 35:65.

In addition, WO 2010/029266 discloses a sizing composition which comprises at least one hydrogenated sugar and a polyfunctional crosslinking agent.

SUMMARY

An aspect of the present invention is to improve such sizing compositions and the products obtained from these compositions.

Another aspect is to provide a sizing composition which combines good performances in terms of tensile strength and recovery of thickness.

Another aspect is to provide a sizing composition which makes it possible to manufacture insulating products which are white in color.

An aspect of the invention relates to a sizing composition capable of crosslinking thermally to form an organic binder, which includes maltitol and at least one polyfunctional crosslinking agent, and to the insulating products which result therefrom.

In order to achieve these, an embodiment of the present invention is based on the selection of a hydrogenated sugar or a mixture of hydrogenated sugars comprising at least 25% by weight of maltitol, calculated on the basis of the dry matter of hydrogenated sugar(s).

In this respect, an embodiment of the invention is directed to a sizing composition, in particular for insulating products based on mineral wool, in particular of glass or of rock, which comprises:

a hydrogenated sugar or a mixture of hydrogenated sugars comprising at least 25% by weight of maltitol, calculated on the basis of the dry matter of hydrogenated sugar(s), and at least one polyfunctional crosslinking agent.

BRIEF DESCRIPTION OF THE DRAWINGS

FIG. 1 shows the variation in the modulus of elasticity E' as a function of temperature in accordance with an embodiment.

DETAILED DESCRIPTION

An embodiment of the invention is directed to a sizing composition, in particular for insulating products based on mineral wool, in particular of glass or of rock, which comprises:

a hydrogenated sugar or a mixture of hydrogenated sugars comprising at least 25% by weight of maltitol, calculated on the basis of the dry matter of hydrogenated sugar(s), and at least one polyfunctional crosslinking agent.

In an embodiment, preferably, the hydrogenated sugar or the mixture of hydrogenated sugars is composed predominantly (to more than 50% by weight) of maltitol, calculated on the basis of the dry matter of the hydrogenated sugar(s).

"Hydrogenated sugar" is understood here to mean all the products resulting from the reduction, in whatever way, of a sugar chosen from monosaccharides, oligosaccharides and polysaccharides which are linear, cyclic or branched, and the mixtures of these products, in particular starch hydrolyzates.

The starch hydrolyzates according to an embodiment of the invention are obtained in a way known per se, for example by enzymatic and/or acid hydrolysis. The degree of hydrolysis of the starch is generally characterized by the dextrose equivalent (DE), defined by the following relationship:

$$DE = 100 \times \left( \frac{\text{number of glycoside bonds cleaved}}{\text{number of glycoside bonds in the starting starch}} \right)$$

The DE of starch hydrolyzates varies according to the method of hydrolysis used (type of enzyme(s), for example) and the degree of hydrolysis: the distribution of products with different degrees of polymerization can vary within wide limits.

In an embodiment, the preferred starch hydrolyzates have a DE of between 5 and 99 and advantageously between 10 and 80.

The sugar can be hydrogenated by known methods operating under conditions of high hydrogen pressure and high temperature in the presence of a catalyst chosen from Groups IB, IIB, IVB, VI, VII and VIII of the Periodic Table of the Elements, preferably in an embodiment from the group consisting of nickel, platinum, palladium, cobalt, molybdenum and their mixtures. In an embodiment, the preferred catalyst is Raney nickel. The hydrogenation converts the sugar or the mixtures of sugars (starch hydrolyzate) to the corresponding polyols.

Although not being preferred, the hydrogenation can be carried out in the absence of hydrogenation catalyst, in the presence of a source of hydrogen other than hydrogen gas, for example an alkali metal borohydride, such as sodium borohydride.

Mention may be made, as examples of hydrogenated sugars, of erythritol, arabitol, xylitol, sorbitol, mannitol, iditol, isomaltitol, lactitol, cellobitol, palatinitol, maltotritol and the products from the hydrogenation of starch hydrolyzates. In an embodiment, preferably, use is made of the products from the hydrogenation of starch hydrolyzates.

The hydrogenated sugar or the mixture of hydrogenated sugars in accordance with an embodiment of the invention can comprise reducing sugars in a low proportion which does not exceed 5% by weight (on a dry basis), preferably 1% by weight in an embodiment and better still 0.5% by weight in an embodiment.

In an alternative embodiment of the invention, the hydrogenated sugar or the mixture of hydrogenated sugars includes at most 11% by weight of sorbitol, calculated on the basis of the dry matter of the hydrogenated sugar(s), preferably at most 9% in an embodiment, advantageously at most 8% in an embodiment, better still at most 6% in an embodiment and particularly preferably at most 4% in an embodiment.

The polyfunctional crosslinking agent is capable of reacting with the hydroxyl groups of the hydrogenated sugar(s) under the effect of heat to form acid bonds, which result in a polymeric network being obtained in the final binder. The polymer network makes it possible to establish bonds at the junction points of the fibers in the mineral wool.

The polyfunctional crosslinking agent is chosen from organic polycarboxylic acids or the salts of these acids, the anhydrides and the polyaldehydes.

"Organic polycarboxylic acid" is understood to mean an organic acid comprising at least two carboxyl functional groups, preferably in an embodiment at most 300 carboxyl functional groups, advantageously in an embodiment at most 70 carboxyl functional groups and better still in an embodiment at most 15 carboxyl functional groups.

The organic polycarboxylic acid can be a nonpolymeric or polymeric acid; it exhibits a number-average molar mass generally of less than or equal to 50 000, preferably in an embodiment of less than or equal to 10 000 and advantageously in an embodiment of less than or equal to 5000.

The nonpolymeric organic polycarboxylic acid is a saturated or unsaturated and linear or branched alicyclic acid, a cyclic acid or an aromatic acid.

The nonpolymeric organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid; a tricarboxylic acid, for example citric acid, tricarballylic acid, 1,2,4-butane-tricarboxylic acid, aconitic acid, hemimellitic acid, trimellitic acid and trimesic acid; or a tetracarboxylic acid, for example 1,2,3,4-butanetetracarboxylic acid and pyromellitic acid. Citric acid is preferred in an embodiment.

Mention may be made, as examples of polymeric organic polycarboxylic acids, of homopolymers of unsaturated carboxylic acids, such as (meth)acrylic acid, crotonic acid, isocrotonic acid, maleic acid, cinnamic acid, 2-methylmaleic acid, fumaric acid, itaconic acid, 2-methylitaconic acid, α,β-methyleneglutaric acid and unsaturated dicarboxylic acid monoesters, such as C1-C10 alkyl maleates and fumarates, and copolymers of at least one abovementioned unsaturated carboxylic acid and at least one vinyl monomer, such as unsubstituted styrene or styrene substituted by alkyl, hydroxyl or sulfonyl groups or by a halogen atom, (meth) acrylonitrile, unsubstituted (meth)acrylamide or (meth)acrylamide substituted by C1-C10 alkyl groups, alkyl (meth)acrylates, in particular methyl (meth)acrylate, ethyl (meth) acrylate, n-butyl (meth)acrylate and isobutyl (meth)acrylate, glycidyl (meth)acrylate, butadiene and a vinyl ester, in particular vinyl acetate.

In an embodiment, preferably, the sizing composition comprises at least one nonpolymeric organic polycarboxylic acid having a number-average molar mass of less than or equal to 1000, preferably in an embodiment of less than or equal to 750 and advantageously in an embodiment of less than or equal to 500, optionally as a mixture with at least one polymeric organic acid.

The polyfunctional crosslinking agent can be an anhydride, in particular maleic anhydride, succinic anhydride or phthalic anhydride. However, the addition of an anhydride to the sizing composition brings about a major fault in the pH, which causes problems of corrosion of the equipment in the line for the manufacture and hydrolysis of the hydrogenated sugar(s). The introduction of a base makes it possible to bring the pH of the sizing composition to a value sufficient to prevent these problems. The cost related to the supplementary addition of the base means that the use of anhydride is not preferred.

The polyfunctional crosslinking agent can also be a polyaldehyde.

"Polyaldehyde" is understood to mean an aldehyde comprising at least two aldehyde functional groups.

In an embodiment, preferably, the polyaldehyde is a nonpolymeric dialdehyde, for example glyoxal, glutaraldehyde, 1,6-hexanedial or 1,4-terephthalaldehyde.

Polyaldehydes have a very high reactivity with regard to the hydroxyl groups of the hydrogenated sugar(s) but also to hydroxyl groups in general, which can present disadvantages, in particular a reduction in the stability and/or a pregelling of the sizing composition before the thermal crosslinking treatment. In order to prevent these disadvantages, the aldehyde functional groups of the polyaldehyde are advantageously masked, to prevent the reaction with the constituents present in the sizing composition, before the mineral wool enters the oven. Mention may be made, as example of agent which makes it possible to mask the aldehyde functional groups, of urea and cyclic ureas.

In the sizing composition, the hydrogenated sugar(s) represent(s) from 10 to 90% of the weight of the mixture composed of the hydrogenated sugar(s) and the polyfunctional crosslinking agent, preferably in an embodiment more than 20%, in particular from 20 to 85% in an embodiment and better still from 30 to 80% in an embodiment.

The sizing composition can additionally comprise an acid or basic catalyst which has in particular the role of adjusting the temperature at which crosslinking begins.

The catalyst can be chosen from Lewis bases and acids, such as clays, colloidal or noncolloidal silica, organic amines, quaternary amines, metal oxides, metal sulfates, metal chlorides, urea sulfates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. In an embodiment, preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate.

In an embodiment, preferably, the catalyst is sodium hypophosphite, sodium phosphite and the mixtures of these compounds.

The amount of catalyst introduced into the sizing composition can represent up to 20% of the weight of the hydrogenated sugar(s) and polyfunctional crosslinking agent, preferably up to 10% in an embodiment, and advantageously is at least equal to 1% in an embodiment.

The sizing composition in accordance with an embodiment of the invention can additionally comprise the conventional additives below in the following proportions, calculated on the basis of 100 parts by weight of hydrogenated sugar(s) and polyfunctional crosslinking agent:

from 0 to 2 parts of silane, in particular an aminosilane in an embodiment, from 0 to 20 parts of oil, preferably from 4 to 15 parts in an embodiment, from 0 to 5 parts of a hydrophobic agent, in particular silicone in an embodiment, from 0 to 20 parts of a polyol other than the hydrogenated sugars, from 0 to 30 parts of urea, preferably from 0 to 20 parts in an embodiment, from 0 to 30 parts of an "extender" chosen from lignin derivatives, such as ammonium lignosulfonate (ALS) or sodium lignosulfonate, and animal or plant proteins.

The role of the additives is known and is briefly restated: the silane is an agent for coupling between the fibers and the binder, and also acts as anti-aging agent; the oils are dust-preventing and hydrophobic agents; the urea acts as plasticizer and in addition makes it possible to adjust the gel time of the sizing composition, in order to prevent problems of pregelling; the "extender" is an organic filler, soluble or dispersible in the sizing composition, which makes it possible in particular to reduce the cost of the latter.

The polyol added as additive is necessarily different from the hydrogenated sugar(s); in particular, polyols provided in the form of polymers comprising nonsaccharide units, such as vinyl alcohol polymers and copolymers, are ruled out.

The sizing composition is prepared by simple mixing of the abovementioned constituents.

The sizing composition obtained exhibits an acidic pH, of the order of 1 to 4, which is preferably maintained at a value at least equal to 1.5 in an embodiment, advantageously at least equal to 3 in an embodiment, so as to limit problems of corrosion of the line for the manufacture of insulating products based on mineral wool. The pH can be adjusted by adding a base to the sizing composition, in particular a nitrogenous base, such as triethanolamine, or ammonium hydroxide or sodium hydroxide or potassium hydroxide.

When the polyfunctional crosslinking agent is a nonpolymeric polyacid, it can be beneficial to subject the sizing composition to a heat treatment, so as to cause a portion of the hydrogenated sugar(s) to react with said polyacid. By virtue of this heat treatment, the content of free polyacids with a low molar mass in the sizing composition is reduced, which has the effect of limiting the gaseous emissions generated during the curing of the size in the oven. The heat treatment is carried out at a temperature which can range from 40 to 130° C.

The sizing composition is intended to be applied to mineral fibers, in particular glass or rock fibers.

Conventionally, the sizing composition is projected onto the mineral fibers at the outlet of the centrifugal device and before they are collected on the receiving member in the form of a web of fibers which is subsequently treated at a temperature which makes possible the crosslinking of the size and the formation of an infusible binder. The crosslinking of the size according to an embodiment of the invention takes place at a temperature comparable to that of a conventional formaldehyde-phenol resin, at a temperature of greater than or equal to 110° C., preferably of greater than or equal to 130° C. in an embodiment and advantageously of greater than or equal to 140° C. in an embodiment.

The acoustic and/or thermal insulating products obtained from these sized fibers also constitute a subject matter of the present invention.

These products are generally provided in the form of a mat or felt of mineral wool, of glass or of rock, or also of a veil of mineral fibers, also of glass or of rock, intended in particular to form a surface coating on said mat or felt. These products exhibit a particularly advantageously white color.

In addition, the insulating products exhibit great resistance to the growth of microorganisms, in particular of molds, which is due to the nonfermentable nature of the hydrogenated sugar(s).

The following examples make it possible to illustrate embodiments of the invention without, however, limiting it.

In these examples, the following are measured:

On the sizing composition the crosslinking start temperature (TC) by the Dynamic Mechanical Analysis (DMA) method, which makes it possible to characterize the viscoelastic behavior of a polymeric material. The procedure is as follows: a sample of Whatman paper is impregnated with the sizing composition (content of organic solids of the order of 40%) and is then fixed horizontally between two jaws. An oscillating component equipped with a device for measuring the stress as a function of the strain applied is positioned on the upper face of the sample. The device makes it possible to calculate the modulus of elasticity E'. The sample is heated to a temperature varying from 20 to 250° C. at a rate of 4° C./min. The curve of variation in the modulus of elasticity E' (in MPa) as a function of the temperature (in ° C.) is plotted from the measurements, the general appearance of the curve being given in FIG. 1. The values corresponding to the crosslinking start temperature (TC), in ° C., corresponding to the crosslinking rate (R), in MPa/° C., are determined on the curve.

the viscosity, expressed in mPa·s, using a rheometer of plate/plate rotational type with shearing of 100 s−1 at 25° C. The sample has a solids content of 40% by weight.

On the insulating product the tensile strength according to the standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in newtons) of the sample is measured and the tensile strength TS, defined by the ratio of the breaking force F to the weight of the sample, is calculated.

The tensile strength is measured after manufacture (initial tensile strength) and after accelerated aging in an autoclave at a temperature of 105° C. under 100% relative humidity for 15 minutes (TS 15).

the initial thickness of the insulating product and the thickness after compressing for 24 hours, 12 days, 1 month and 3 months with a degree of compression (defined as being the ratio of the nominal thickness to the thickness under compression) equal to 8/1. The thickness measurements make it possible to evaluate the good dimensional behavior of the product.

EXAMPLES 1 TO 6

Sizing compositions are prepared which comprise the constituents appearing in Table 1, expressed as parts by weight.

The sizing compositions are prepared by successively introducing, into a vessel, the hydrogenated sugar(s), citric acid and sodium hypophosphite (catalyst) with vigorous stirring until the constituents have completely dissolved.

The properties of the sizing compositions which appear in the following table 1 are evaluated in comparison with a conventional sizing composition including a formaldehyde-phenol resin and urea (Reference) prepared in accordance with example 2, test 1, of WO 01/96254 A1, on the one hand, and with a composition in which the mixture of hydrogenated sugars contains 12% of maltitol, 12% of sorbitol and 76% of other hydrogenated sugars (Polysorb® 70/12, sold by Roquette).

TABLE 1

| | Example | | | | | | |
|---|---|---|---|---|---|---|---|
| | 1 | 2 | 3 | 4 | 5 | 6 (Comp.) | Ref. |
| Sizing composition | | | | | | | |
| Polysorb ® 70/12 | — | — | — | — | — | 58 | — |
| Maltilite ® P 200 | 44 | — | — | — | — | — | — |
| Maltilite ® 5575 | — | 48 | 41 | — | — | — | — |
| Maltilite ® 7575 | — | — | — | 47 | 40 | — | — |
| Citric acid | 56 | 52 | 59 | 53 | 60 | 42 | — |
| Sodium hypophosphite | 5 | 5 | 5 | 5 | 5 | 5 | — |
| Properties | | | | | | | |
| Crosslinking start temp. $T_c$ (° C.) | 144 | 137 | 135 | 132 | 132 | 155 | 144 |
| Viscosity at 25° C. (mPa·s)[(1)] | n.d. | 4.2 | n.d. | 4.9 | n.d. | 6.0 | 6.0 |

Maltilite ® P 200, sold by Tereos: crystalline D-maltitol
Maltilite ® 5575, sold by Tereos: maltitol syrup comprising 75% of dry matter comprising 55% of maltitol
Maltilite ® 7575, sold by Tereos: maltitol syrup comprising 75% of dry matter comprising 75% of maltitol
[(1)]solution with a solids content of 40%
n.d.: not determined The sizing compositions of examples 1 to 5 have a crosslinking start temperature (TC) which is similar to or better than that of the Reference and better than that of comparative example 6.

The compositions of examples 1 to 6, and also the formaldehyde-phenol resin (Reference), are used to form insulation products based on glass wool.

Glass wool is manufactured by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is positioned beneath the fiberizing disk so as to uniformly distribute the sizing composition over the glass wool which has just been formed.

The mineral wool, thus sized, is collected on a belt conveyor equipped with internal extraction boxes which hold the mineral wool in the form of a felt or web at the surface of the conveyor. The conveyor subsequently moves through an oven maintained at 290° C. where the constituents of the size polymerize to form a binder. The insulating product obtained exhibits a nominal density of 10.6 kg/m3, a nominal thickness of approximately 80 mm and a loss on ignition of the order of 5%.

The properties of the insulating products are given in table 2 below.

TABLE 2

| | Example | | | | | | |
|---|---|---|---|---|---|---|---|
| | 1 | 2 | 3 | 4 | 5 | 6 (Comp.) | Ref. |
| Properties Tensile strength (N) | | | | | | | |
| initial | 3.2 | 3.0 | 3.1 | 2.9 | 3.0 | 2.4 | 2.6 |
| after aging (TS 15) | 1.9 | 1.7 | 2.1 | 1.9 | 1.9 | 1.8 | 2.4 |
| Thickness (mm) | | | | | | | |
| after 24 hours | 142 | 138 | 142 | 137 | 139 | 139 | 149 |
| after 12 days | 132 | 127 | 134 | 129 | 128 | 118 | 141 |
| after 1 month | 133 | 129 | 140 | 132 | 130 | 126 | 144 |
| after 3 months | 130 | 126 | — | 128 | 127 | 119 | 141 | n.d.: not determined

The insulating products manufactured with the sizing compositions of examples 1 to 5 exhibit better properties with respect to the Reference product and the product of comparative example 6 in terms of tensile strength before aging and a better recovery of thickness after compression for 12 days, 1 month and 3 months with respect to comparative example 6.

The products according to an embodiment of the invention are more rigid after 1 month of compression.

What is claimed is:

1. A sizing composition for insulating products based on mineral wool, comprising:
    a hydrogenated sugar or a mixture of hydrogenated sugars, the hydrogenated sugar or the mixture of hydrogenated sugars comprising from 25% to 85% by weight of maltitol, calculated on the basis of the dry matter of the hydrogenated sugar(s), and at most 11% by weight of sorbitol, calculated on the basis of the dry matter of the hydrogenated sugar(s), and
    at least one polyfunctional crosslinking agent.

2. The composition as claimed in claim 1, wherein the hydrogenated sugar(s) is (are) selected from the group consisting of monosaccharides, oligosaccharides and polysaccharides which are linear, cyclic or branched, and mixtures thereof.

3. The composition as claimed in claim 1, wherein the hydrogenated sugar(s) is (are) glycerol, erythritol, arabitol, xylitol, sorbitol, mannitol, iditol, maltitol, isomaltitol, lactitol, cellobitol, palatinitol, maltotritol and products from hydrogenation of starch hydrolyzates.

4. The composition as claimed in claim 3, wherein the hydrogenated sugar(s) is (are) a product from the hydrogenation of starch hydrolyzates.

5. The composition as claimed in claim 1, wherein the hydrogenated sugar(s) comprise(s) reducing sugars in a proportion not exceeding 5% by weight on a dry basis.

6. The composition as claimed in claim 5, wherein the hydrogenated sugar(s) comprise(s) reducing sugars in a proportion not exceeding 1% by weight.

7. The composition as claimed in claim 6, wherein the hydrogenated sugar(s) comprise(s) reducing sugars in a proportion not exceeding 0.5% by weight.

8. The composition as claimed in claim 1, wherein the at least one polyfunctional crosslinking agent is selected from the group consisting of an organic polycarboxylic acids or salts of said acids, anhydrides and polyaldehydes.

9. The composition as claimed in claim 8, wherein the organic polycarboxylic acid comprises at least two carboxyl functional groups.

10. The composition as claimed in claim 9, wherein the organic polycarboxylic acid comprises at most 300 carboxyl functional groups.

11. The composition as claimed in claim 10, wherein the organic polycarboxylic acid comprises at most 70 carboxyl functional groups.

12. The composition as claimed in claim 11, wherein the organic polycarboxylic acid comprises at most 15 carboxyl functional groups.

13. The composition as claimed in claim 9, wherein the organic polycarboxylic acid exhibits a number-average molar mass of less than or equal to 50 000.

14. The composition as claimed in claim 13, wherein the organic polycarboxylic acid exhibits a number-average molar mass of less than or equal to 10 000.

15. The composition as claimed in claim 14, wherein the organic polycarboxylic acid exhibits a number-average molar mass of less than or equal to 5000.

16. The composition as claimed in claim 8, wherein the organic polycarboxylic acid is selected from the group consisting of saturated or unsaturated and linear or branched alicyclic nonpolymeric organic polycarboxylic acids, cyclic acids and aromatic acids and mixtures thereof.

17. The composition as claimed in claim 16, wherein the organic polycarboxylic acid is selected from the group consisting of dicarboxylic acids, and its derivatives, tricarboxylic acids, and tetracarboxylic acids.

18. The composition as claimed in claim 8, wherein the organic polycarboxylic acid is a polymeric organic polycarboxylic acid.

19. The composition as claimed in claim 8, wherein the anhydride is maleic anhydride, succinic anhydride or phthalic anhyride.

20. The composition as claimed in claim 8, wherein the polyaldehyde is a nonpolymeric dialdehyde.

21. The composition as claimed in claim 20, wherein the aldehyde functional groups of the polyaldehyde are masked by urea or by cyclic ureas.

22. The composition as claimed in claim 1, wherein the hydrogenated sugar(s) represent(s) from 10 to 90% of the weight of the mixture composed of the hydrogenated sugar(s) and the polyfunctional crosslinking agent.

23. The composition as claimed in claim 22, wherein the hydrogenated sugar(s) represent(s) at least 20% of the weight of the mixture composed of the hydrogenated sugar(s) and the polyfunctional crosslinking agent.

24. The composition as claimed in claim 23, wherein the hydrogenated sugar(s) represent(s) from 20 to 85% of the weight of the mixture composed of the hydrogenated sugar(s) and the polyfunctional crosslinking agent.

25. The composition as claimed in claim 23, wherein the hydrogenated sugar(s) represent(s) at least 30% of the weight of the mixture composed of the hydrogenated sugar(s) and the polyfunctional crosslinking agent.

26. The composition as claimed in claim 23, wherein the hydrogenated sugar(s) represent(s) from 30 to 80% of the weight of the mixture composed of the hydrogenated sugar(s) and the polyfunctional crosslinking agent.

27. The composition as claimed in claim 1, comprising a catalyst selected from the group consisting of Lewis acids and bases, phosphorus-comprising compounds and compounds comprising fluorine and boron.

28. The composition as claimed in claim 27, wherein the catalyst represents up to 20% of the weight of the hydrogenated sugar(s) and polyfunctional crosslinking agent.

29. The composition as claimed in claim 28, wherein the catalyst represents up to 10% of the weight of the hydrogenated sugar(s) and polyfunctional crosslinking agent.

30. The composition as claimed in claim 29, wherein the catalyst represents up to 1% of the weight of the hydrogenated sugar(s) and polyfunctional crosslinking agent.

31. The composition as claimed in claim 1, comprising the additives below in the following proportions, calculated on the basis of 100 parts by weight of hydrogenated sugar(s) and polyfunctional crosslinking agent:
from 0 to 2 parts of silane,
from 0 to 20 parts of oil,
from 0 to 5 parts of a hydrophobic agent,
from 0 to 20 parts of a polyol other than the hydrogenated sugars,
from 0 to 30 parts of urea,
from 0 to 30 parts of an extender selected from the group consisting of ammonium lignosulfate (ALS) or sodium lignosulfate, and animal or plant proteins.

32. The composition as claimed in claim 31, wherein the silane is an aminosilane.

33. The composition as claimed in claim 31, comprising from 4 to 15 parts of oil.

34. The composition as claimed in claim 31, comprising from 0 to 20 parts of urea.

35. The composition as claimed in claim 17, wherein the organic polycarboxylic acid is selected from the group consisting of oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid, and its derivatives, tetrahydrophthalic acid and its derivatives, isophthalic acid, terephthalic acid, mesaconic acid, citraconic acid, citric acid, tricarballylic acid, 1,2,4-butanetricarboxylic acid, aconitic acid, hemimellitic acid, trimellitic acid, trimesic acid, 1,2,3,4-butanetetracarboxylic acid and pyromellitic acid.

36. The composition as claimed in claim 18, wherein the polymeric organic polycarboxylic acid is selected from the group consisting of homopolymers of unsaturated carboxylic acids and copolymers of at least one unsaturated carboxylic acid and of at least one vinyl monomer.

37. The composition as claimed in claim 36, wherein the unsaturated carboxylic acid is (meth)acrylic acid, crotonic acid, isocrotonic acid, maleic acid, cinnamic acid, 2-methylmaleic acid, fumaric acid, itaconic acid, 2-methylitaconic acid, α,β-methyleneglutaric acid and unsaturated dicarboxylic acid monomers, and the vinyl monomer is unsubstituted styrene or styrene substituted by alkyl, hydroxyl or sulfonyl groups or by a halogen atom, (meth)acrylonitrile, unsubstituted (meth)acrylamide or (meth)acrylamide substituted by $C_1$-$C_{10}$ alkyl groups, alkyl (meth)acrylates, glycidyl (meth) acrylate, butadiene and a vinyl ester.

38. The composition as claimed in claim 20, wherein the polyaldehyde is glyoxal, glutaraldehyde, 1,6-hexanedial or 1,4-terephthalaldehyde.

39. An acoustic and/or thermal insulating product based on mineral wool, sized with the sizing composition as claimed in claim 1.

40. A veil of mineral fibers, sized with the sizing composition as claimed in claim 1.

* * * * *